Figure 1:
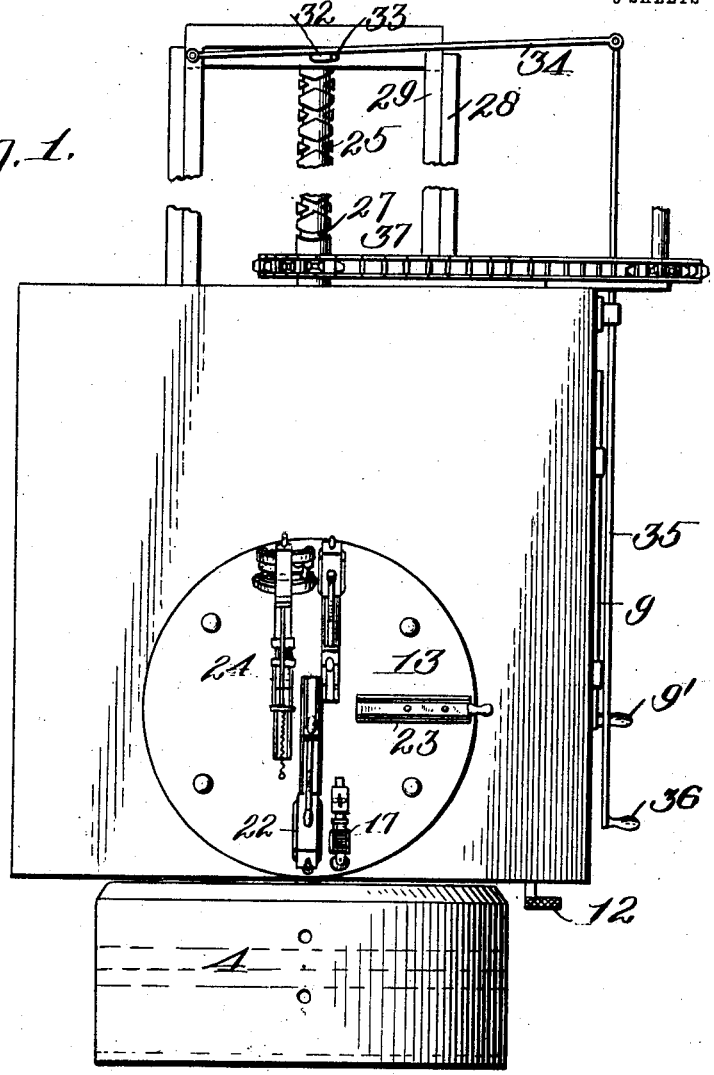

No. 753,813. PATENTED MAR. 1, 1904.
U. P. SMITH.
MACHINE FOR MAKING PNEUMATIC TIRES.
APPLICATION FILED APR. 18, 1903. RENEWED FEB. 5, 1904.
NO MODEL. 3 SHEETS—SHEET 1.

Witnesses:
C. S. Kesler.
James L. Norris, Jr.

Inventor
Uzziel P. Smith
By
James L. Norris.
Atty

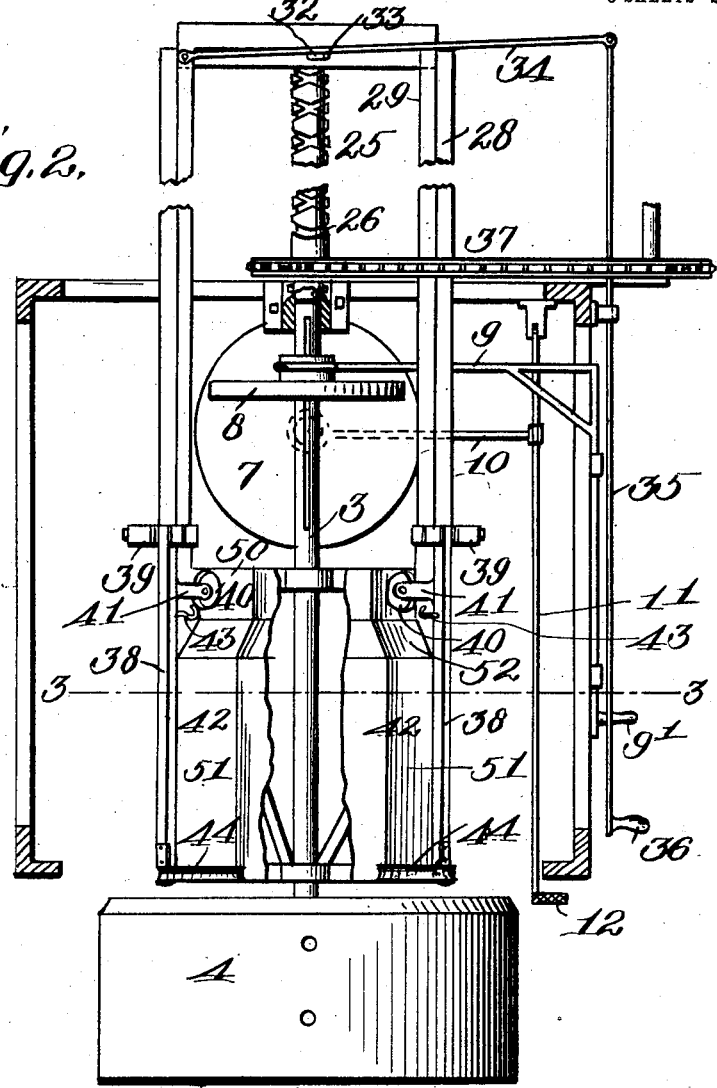

No. 753,813. PATENTED MAR. 1, 1904.
U. P. SMITH.
MACHINE FOR MAKING PNEUMATIC TIRES.
APPLICATION FILED APR. 18, 1903. RENEWED FEB. 5, 1904.
NO MODEL. 3 SHEETS—SHEET 3.
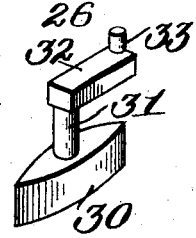
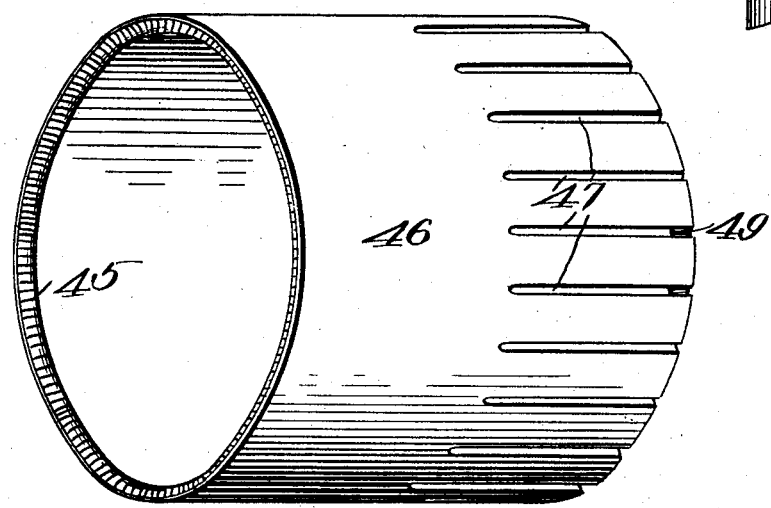
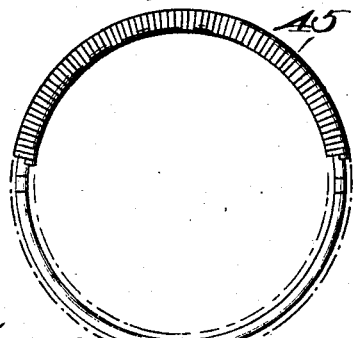  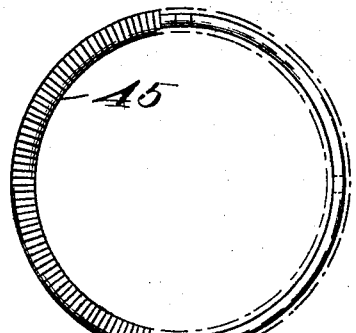
Witnesses
C. L. Kesler
James L. Norris, Jr.
Inventor
Uzziel P. Smith
By James L. Norris
Atty.

No. 753,813. Patented March 1, 1904.

UNITED STATES PATENT OFFICE.

UZZIEL P. SMITH, OF CHICAGO, ILLINOIS.

MACHINE FOR MAKING PNEUMATIC TIRES.

SPECIFICATION forming part of Letters Patent No. 753,813, dated March 1, 1904.

Original application filed November 25, 1902, Serial No. 132,760. Divided and this application filed April 18, 1903. Renewed February 5, 1904. Serial No. 192,176. (No model.)

*To all whom it may concern:*

Be it known that I, UZZIEL P. SMITH, a citizen of the United States, residing at Chicago, in the county of Cook and State of Illinois, have invented new and useful Improvements in Machines for Making Pneumatic Tires, of which the following is a specification.

This invention relates to a machine for making pneumatic tires, and the present application is a division of a contemporaneously pending application for patent for a machine for making pneumatic tires, No. 132,760, and filed November 25, 1902.

In the drawings accompanying and forming a part of this specification I have shown a simple and convenient organization for making tires or analogous tubular articles, but it is not my intention to limit the invention to such organization, as many variations in the construction of the different mechanisms may be adopted.

Figure 4:
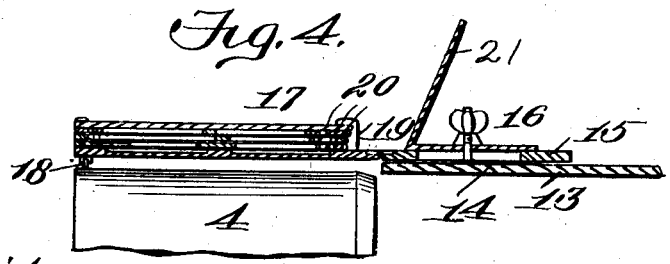

In said drawings, Figure 1 is a plan view of said machine. Fig. 2 is a similar view with the top of the framework removed. Fig. 3 is a sectional front elevation, the section being taken on the line 3 3 of Fig. 2. Fig. 4 is a sectional side elevation of a part of the turntable, the duplex stock-layer, drum, and certain coöperating parts. Fig. 5 is a longitudinal central section of said stock-layer. Fig. 6 is a plan view of a compound screw. Fig. 7 is a perspective view of a shoe coöperative with said screw. Fig. 8 is a like view of an elastic band. Figs. 9, 10, and 11 are detail views of an expansible ring.

Like characters of reference refer to like parts in the different figures of the drawings.

The framework for sustaining the different parts of the machine is the same as that disclosed in the copending application to which I have hereinbefore referred and is denoted in a general way by 2, said frame supporting by suitable bearings below its top the shaft 3, upon the forward end of which the wide-faced drum 4 is suitably fastened. A vertical shaft 5 is disposed below and at right angles to the horizontal shaft 3, it being suitably driven—say, by the pulley 6, the operating-belt for which is not shown.

At the upper end of the shaft 5 is a driving-disk 7, meshing with the driven disk 8 upon the horizontal drum-carrying shaft 3, the disk 8 being slidable on its shaft toward and from the center of the driving-disk in order to vary the speed of the shaft 3, and consequently of the drum 4 carried thereby. The shifting means for the disk 8 is represented as a right-angular arm 9, one branch of which is loosely connected with the hub of said disk, while the other branch thereof is guided by suitable means upon the framework and terminates at its forward end in a handle 9', by which the said disk can be readily manipulated. The shaft or spindle 5, which carries the pulley 6 and disk 7, is supported by a lever 10, fulcrumed upon the framework and connected at its outer end to the lever 11, pivoted at its inner end to the rear of the frame 2 and provided at its forward end with a treadle 12. By pressing down upon the treadle 12 the continuously-operating driving-disk 7 will be forced against the companion disk 8 in order to rotate the shaft 3, and consequently the drum 4. The spindle and the parts carried thereby normally rest by their own weight against the floor upon which the machine is mounted. When it is desired to rotate the drum 4 for the formation of a tire, as will hereinafter appear, the forward end of the foot-lever 11 is moved downward in order to put the two disks 7 and 8 into working relation. When the two disks are out of contact, at which time the lower end of the spindle 5 rests against the floor, the drum 4 will of course be at rest, so that it may be rotated in either direction by hand in order to bring any part of the periphery or surface thereof in line or substantially in line with the top of the frame 2. Other mechanisms than the friction or driving one described may be employed equally well for effecting the intermittent rotation of the drum 4 and for also changing the speed of the same, as the invention is not limited in this respect. It will be seen that the driving and speed-controlling devices for said drum are situated under the top of the frame, where they are out of the way.

Upon the top of the frame 2 is the turntable 13, which operates and is constructed exactly like the corresponding part disclosed by the copending application, to which I have hereinbefore alluded, with one exception, and that is the stock-layer. The stock-layer in said copending application is adapted to lay a composite strip upon the drum. The stock-layer in the present instance, as will hereinafter appear, lays two composite strips upon the drum side by side. Said turn-table 13 carries stock-laying, tube-punching, tube-forming, and tube-rolling devices, which are adapted to be successively brought into use by rotating the turn-table, suitable stops being provided to hold the turn-table with any one of said devices in working position with respect to the drum.

The stock-layer, as will hereinafter appear, is adapted to lay two composite strips side by side upon the drum 4, the composite strips, after their formation, being suitably pressed together in order that the plies will be brought into permanent adherence. The duplex stock-layer shown will now be described.

Upon the upper side of the turn-table 13 and extending approximately radially thereof is the slideway 14, which receives the slide 15, the two parts being adjustably connected by a screw and longitudinal slot connection, (denoted in a general way by 16.) To the outer end of said slide is hinged the foundation plate or leaf 17 of the duplex stock-layer, which is provided at its outer end and upon the bottom with an antifriction-roller 18, adapted when the stock-layer is in its effective position to travel against the periphery of the drum 4 near the outer edge thereof, whereby the stock-layer and drum will be held in proper working relation.

At or near the hinged end of the foundation plate or leaf 17 of the stock-layer are the vertical lugs 19, between which the upper leaves 20 of the stock-layer are pivoted, said several leaves being adapted to fold or close upon each other. When the stock-layer is not in use, the several leaves are folded together face to face and occupy a substantially upright position, with the innermost plate abutting against a stop 21, rising from the slideway 14. When the stock-layer is to be used, the turn-table 13 will be rotated to bring the forward end of the slide 15 into proximity with the drum 4, after which the slide will be rotated until the leaves of the stock-layer can be swung down and across the periphery of the drum and at right angles thereto, said leaves, as will be understood, being brought successively into use.

In the stock-layer disclosed by the copending application, hereinbefore mentioned, there were five leaves so related as to superpose five strips upon a drum, said stock-layer maintaining the strips in absolutely correct lateral relation as the drum was rotated, the stock-layer during the rotation of the drum being stationary for the time being.

The stock-layer hereinbefore described is adapted to lay two composite strips side by side upon the drum, and it will be seen that it consists of five leaves, the foundation-leaf and the three next upper ones having parallel channels, while the upper leaf simply confines the two uppermost strips laid by the uppermost working leaf in place. The inner series of channels of the stock-laying leaves are adapted to lay the superposed strips that are to constitute the air-bag of the tire near the inner edge thereof, and it will be understood that there are four of said strips, three of which may be of fabric, while the other one, or the one laid by the uppermost working leaf, is of rubber. The outer channels are adapted to superpose four strips that are to constitute the protecting envelop or cover for the air-bag.

In making a tire by the present machine the following operation takes place: The initial strip that is to compose the air-bag is first suitably clamped at one end to the drum 4, after which the turn-table 13 is operated to bring the slide 15 opposite the drum, following which said slide is advanced to about the inner edge of said drum and the foundation-plate 17 in the stock-layer is then swung down across the drum, subsequent to which said strip is placed in the inner channel of said foundation-plate. The drum is then rotated, which results in drawing the strip through the said channel, which is of approximately the same width of the strip, whereby said strip will be laid upon the periphery of the drum in an absolutely correct manner as said drum rotates. The ends of the strip are then brought together. The second leaf of the stock-layer is then brought down against the foundation one, and a second strip, the front end of which is pressed down against the first strip, is then laid in the inner channel of the second leaf and the drum again rotated in order to form the second strip into tubular form. This operation is performed with the several leaves, and when it is concluded it will be found that there are four superimposed strips upon the inner side of the drum, the ends of which are overlapped and which are in absolutely correct lateral relation with respect to each other. After the formation of this composite strip, which, it will be understood, is annular, the several plies thereof are rolled together by a stock-roller 22, shown only in Fig. 1, and which it is not necessary to describe in detail, as it is fully illustrated in the said copending application. After the layers that are to compose the air-bag of the tire have been placed upon the drum a second composite strip is laid upon the drum by following out exactly the same operation as that just described, except, of course, that the strips are laid in the outer channels of the stock-layer, the channels, as will be evident, being side by side in order to secure such relation of the two strips upon the drum. After the laying of the second composite strip the plies or layers thereof are rolled together exactly as in the case of the other one. After the strips have been laid side by side upon the drum they are punched in order to receive the nipples of the valves, and the punching mechanism is shown only in Fig. 1 and is denoted in a general way by 23. After the two composite strips have been punched and the punched holes closed in some suitable way the inner composite strip, which, as is evident, is to constitute the air-bag of the tire, is shaped into tubular form by the tube-forming mechanism, which is identically like that described in the hereinbefore-mentioned application, is shown only in Fig. 1, and is denoted in a general way by 24. The machine covered by this application is primarily adapted for constructing heavy tires, which are made up of a large number of layers or plies, such tires being generally employed for vehicle-wheels. After the tube made from the inner composite strip is formed said tube is automatically rolled across the outer composite strip, which is to constitute the protective envelop or covering thereof, in order that as the inflated tube rolls across said outer composite strip it will take up the same, to thereby wholly inclose the air-bag. As will hereinafter appear, the air-bag is rolled back and forth upon the drum and across the outer composite strip thereon, so that the composite strip will wholly envelop the air-bag in order to make a complete and thoroughly accurate tire.

The mechanism illustrated for rolling the air-bag across the composite strip will now be set forth.

After the inflated tube or air-bag has been rolled across the composite strip, if necessary, a second composite strip may be laid upon the drum and the tubular article rolled across the same in order to further increase the thickness of the tire. The number of the strips, however, is not an essential feature; but by virtue of the improved construction such number may be a large one, and the tube formed thereby is thoroughly accurate as to form, which is an important consideration in automobile-tires. Upon the rear of the frame 2 is a screw 25, having right and left intersecting threads and the annular grooves 26 and 27 at its ends, into which the threads open. Below the top of the frame and situated substantially in the same horizontal plane as the shaft 3 is a three-sided substantially rectangular slideway 28 for the similarly-shaped slide 29. A shoe is shown at 30, it being of somewhat-elongated elliptical form and being fitted normally in the outermost annular groove or channel 26. The cross-bar of the slideway 28 contains a hole or seat through which the vertical stem 31 of the shoe extends, said stem terminating at its upper end in a crank-arm 32, provided at its free end, on the upper side, thereof with the crank-pin 33, adapted to be engaged by the lever 34, fulcrumed upon one branch of the slideway and connected at its outer end to the sliding rod 35. Said rod 35 terminates at its forward end in a handle 36, by which the same, and consequently the lever connected therewith, can be operated. Said lever 34 is adapted to engage the crank-pin, and when this operation takes place, which is secured by pulling the rod 35 forward, one end of the shoe is caused to enter the right thread or groove of the compound screw 25, thereby moving the shoe, and hence the slide, inward or forward. The screw is continuously operated in some convenient manner—for example, by sprocket-gearing, (denoted in a general way by 37.) When the shoe has traversed the entire length of the right thread of the screw, it enters the annular and approximately cam-shaped groove 27 at the inner end of the screw, and when the open end of the left thread comes opposite the point of the shoe the latter is caused to turn by the cam-shaped groove and enter said left thread to return the shoe, and consequently the slide, to the initial positions thereof. It will be understood, therefore, that the slide is reciprocated each time the lever 34 is manually operated. Arms 38 are pivoted at their inner extremities to the upper and lower ends, respectively, of the oppositely-disposed projections 39 at the free ends of the branches of the yoke-shaped slide 29 and are provided near their pivots with the antifriction-rollers 40, journaled upon suitable projections 41 on said arms, said rollers 40 being adapted to travel along the surface of the track 42, the function of which will hereinafter appear. The pivotally-mounted arms 38 carry on their inner sides at a point in proximity to their pivots the hooks 43 and terminate at their free or forward ends in the grooved segmental heads 44, the grooves of said heads being adapted to receive an expansible ring 45 of some suitable kind, which may be constructed as shown in Figs. 9, 10, and 11 and which is connected with the forward end of the circumferentially expansible or elastic band 46, which is usually of rubber. The inner end of the band is slotted, as at 47, in order to avoid friction, as said band travels forward when surrounding the drum and the tire thereon. The inner end of the elastic band 46 is provided with a ring 49, constructed exactly like the other one and adapted to engage the hooks 43.

The track 42, along which the rollers 40 travel as the slide 29 is moved back and forth, is shown as being octangular in cross-section and as being of narrow and wide diameters, as indicated, respectively, by the numerals 50 and 51, such narrow and wide portions being united by the beveled portion or rise 52.

When the slide is in its retracted or rearward position, the rollers 40 will be in contact with the narrow or reduced portion 50 of the track 42. When the slide is advanced a short distance, the rollers will travel along the beveled portion 52, thereby swinging the arms 38 outward and opening or expanding the elastic band 46, so that the same will be caused to encircle the drum 4 and an inflated tube or airbag embracing the same. When the band is in its normal or retracted position, it is of less diameter than the drum 4 and occupies a position under the top of the frame 2, but when the mechanism just described is set into motion said band is expanded, so that it is adapted to inclose the drum and inflated tube thereon, whereby as the band moves back and forth it will roll said tube in a corresponding direction and upon the periphery of the drum, said periphery being made sufficiently wide to permit this operation, the inflated bag and composite strip which are to compose the tire being side by side upon the drum, as shown by dotted lines in Fig. 1. The elastic band is moved forward by the mechanism just described, said band being opened at its mouth its full width at about the time it reaches the inner end of the drum, at which point the antifriction-rollers 40 will have just entered the wider portion 51 of the track 42. As the band continues to advance, it rolls the air-bag outward and across superposed strips placed by the side of the same, taking up the said strips, which thereby inclose the air-bag, the bag being wholly inclosed at about the time the expansible band 46 reaches its extreme advanced position. As the band travels rearward the air-bag and the composite strip or layers surrounding the same are rolled back on the drum, so that the several parts are firmly united to make a complete tire. The band after it leaves the tire moves rearward and will pass free of the drum, the completed tire being left on the latter. As the band is elastic and somewhat smaller than the drum in its normal position, it clings very tightly to the top and sides of the air-bag and tire as it is moved forward and backward, so that the several layers composing the tire are pressed and rolled uniformly together throughout the entire circumference of the tire, thereby producing an article which is of accurate tubular circumference throughout the entire length thereof. After the tire is formed by the action of the band it may be further rolled by hand or mechanically, if desired.

The invention is not limited to the exact construction hereinbefore described, for many variations may be adopted within the scope of my claims.

Having thus described my invention, what I claim as new, and desire to secure by Letters Patent, is—

1. In a machine of the class described, a member adapted to support a tube and strip, a device for causing the tube to roll in one direction across the strip in order to envelop said tube with said strip and for subsequently causing the said tube with its surrounding strip or envelop to roll in the opposite direction, and mechanism for automatically reciprocating one of said parts relatively to the other.

2. In a machine of the class described, a member adapted to support a tube and a strip, a device normally free of said member and adapted for causing the tube to roll in one direction across the strip in order to envelop said tube with said strip and for subsequently causing the tube with its surrounding strip or envelop to roll in the opposite direction, and mechanism for automatically reciprocating one of said parts relatively to the other.

3. In a machine of the class described, a drum, the periphery of which is adapted to receive an annular tube and an annular strip, a band for causing the tube to roll in one direction across the strip in order to envelop the tube with said strip for subsequently causing the tube with its surrounding strip or envelop to roll in the opposite direction, and mechanism for automatically reciprocating one of said parts relatively to the other.

4. In a machine of the class described, a drum adapted to support a tube and a strip, a circumferentially-expansible band, and means for operating one of said parts relatively to the other and for circumferentially expanding the band during such motion to cause said band to surround the tube and to roll it across the strip.

5. In a machine of the class described, a drum the periphery of which is adapted to receive an annular tube and an annular strip side by side, an elastic band mounted for reciprocation and adapted on its advancing stroke to embrace the tube on said drum and to roll it across said strip, and means for expanding the band on its advancing stroke.

6. In a machine of the class described, a drum, the periphery of which is adapted to receive an annular tube and an annular strip side by side, an elastic band mounted for reciprocation and adapted on its advancing stroke to embrace said tube and roll it across said strip, a plurality of pivotally-mounted arms to which said band is connected, and means for swinging said arms outward on the advancing stroke of the band.

7. In a machine of the class described, a drum the periphery of which is adapted to receive an annular tube and an annular strip side by side, an elastic band mounted for reciprocation and adapted on its advancing stroke to embrace said tube and roll it across said strip, a slide, means for reciprocating said slide, arms pivotally supported by said slide connected with the band, and provided with rollers, and a track along which said rollers are adapted to travel and having means for operating said rollers to swing said arms outward.

8. In a machine of the class described, a drum the periphery of which is adapted to receive an annular tube and an annular strip side by side, an elastic band mounted for reciprocation, and means for expanding said band at its front or advance end sufficiently to enable the same to embrace the tube on said drum and roll said tube across said strip.

9. In a machine of the class described, a drum, means for superimposing strips of material upon said drum with the strips side by side, independent means for forming one of the composite strips into a tube, a reciprocatory elastic band adapted on one stroke to receive the drum and tube thereon and to roll said tube across the other strip, and mechanism for expanding the forward end of the band during the advancing movement thereof.

10. In a machine of the class described, a drum adapted to support a tube and a strip side by side, an expansible band normally free of the drum, mechanism for reciprocating the band relatively to the drum, and means for expanding said band during its advancing movement.

In testimony whereof I have hereunto set my hand in presence of two subscribing witnesses.

UZZIEL P. SMITH.

Witnesses:
   GEO. W. ROGERS,
   C. E. BINGHAM.